United States Patent [19]
Imamura

[11] Patent Number: 5,963,717
[45] Date of Patent: Oct. 5, 1999

[54] IMAGE PROCESSING APPARATUS

[75] Inventor: Kenji Imamura, Saitama, Japan

[73] Assignee: Fuji Xerox Co., Ltd., Tokyo, Japan

[21] Appl. No.: 08/792,834

[22] Filed: Jan. 30, 1997

[30] Foreign Application Priority Data

Jan. 31, 1996 [JP] Japan .................................. 8-037353
[51] Int. Cl.$^6$ .................................................. G06F 15/00
[52] U.S. Cl. .......................... 395/114; 395/115; 395/280; 395/287
[58] Field of Search ................................. 395/114, 115, 395/116, 825, 827, 842, 847, 872, 873, 112, 280, 287

[56] References Cited

U.S. PATENT DOCUMENTS

| | | | |
|---|---|---|---|
| 5,434,983 | 7/1995 | Yaso et al. | 358/442 |
| 5,574,834 | 11/1996 | Horie et al. | 395/114 |
| 5,606,428 | 2/1997 | Hanselman | 358/404 |
| 5,764,865 | 6/1998 | Masubuchi et al. | 395/114 |

FOREIGN PATENT DOCUMENTS 4-256186  9/1992  Japan .

Primary Examiner—Edward L. Coles
Assistant Examiner—Mark Wallerson
Attorney, Agent, or Firm—Finnegan, Henderson, Farabow, Garrett & Dunner, L.L.P.

[57] ABSTRACT

An image processing apparatus has a buffer storage section for temporarily storing image data supplied from a system bus; an image processing section for receiving the data read out of the buffer storage section for performing image processing on the received data; a storage section for temporarily storing output data of the image processing section and transferring the output data to the system bus; a gate section for releasing connection between the system bus and the buffer storage section; and a control section for controlling the respective sections so that input/output of data with respect to the image processing section and input/output of data with respect to the system bus are performed in parallel. Accordingly, the transfer on the bus, and the internal transfer from the buffer to the image processing apparatus are operated separately for each other, so that the image processing apparatus can be operated at a high speed.

6 Claims, 4 Drawing Sheets

IMAGE PROCESSING APPARATUS

BACKGROUND OF THE INVENTION

1. Field of the Invention

The present invention relates to an image processing apparatus such as a printer, a copying machine, a facsimile equipment, etc., and particularly relates to an image processing apparatus having a high-speed image processing function.

2. Description of the Related Art

There has been a case where certain image processing is performed upon image data to be transferred to, for example, a laser printer for the purpose of improving the picture quality, reducing the cost of a storage device, and so on. In addition, the resolution of a printer and the speed of printing have been improved recently, and the speed of data transfer has become the most important factor in view of connection of the printer. It has been therefore necessary to increase the speed of data transfer including image processing in order to realize high-speed printing.

As for a system for improving the data transfer speed, a system in which data is compressed by a controller and the compressed data is transferred to a printer to thereby reduce the amount of transferred data is disclosed, for example, in Japanese Patent Unexamined Publication No. Hei. 4-256186. In this system, a compressing circuit in the controller locally reads out image data stored in an image memory, compresses the read-out data, and outputs the compressed data to a printer. In addition, compressed image data supplied from an image input device is expanded by an expanding circuit, and then written into the image memory.

In such a conventional system, there is no device to improve the data transfer speed in compressing processing per se, so that the time taken for the compression decides the maximum data transfer speed to a printer. Next printing is started after passage of the time taken for writing image data into the image memory. Therefore, there has been a problem that high-speed image processing/printing is difficult. In addition, there has been another problem that an expanding device is required to be provided in the printer side.

SUMMARY OF THE INVENTION

An object of the present invention is to provide an image processing apparatus in which the foregoing problems belonging to the conventional system can be solved and high-speed image processing can be realized.

In order to achieve the foregoing object, according to the present invention, there is provided an image processing apparatus in which image data is compressed, the compressed image data is stored, and the stored compressed data is expanded so as to be outputted from a printer, the apparatus comprising: a system bus; a local bus connected to the system bus; a buffer memory provided on the local bus for storing data to be compressed/expanded sent for the system bus; a compressing/expanding section for compressing/expanding the data to be compressed/expanded read out from the buffer memory and transferring the compressed/expanded data to the system bus through the local bus; separating means for releasing connection of the local bus between the system bus and the buffer memory; and control means for controlling a releasing operation of the separating means and a transferring operation of transferring the data to be compressed/expanded sent from the system bus to the system bus through the local bus.

DETAILED DESCRIPTION OF THE PREFERRED EMBODIMENT

Figure 2:
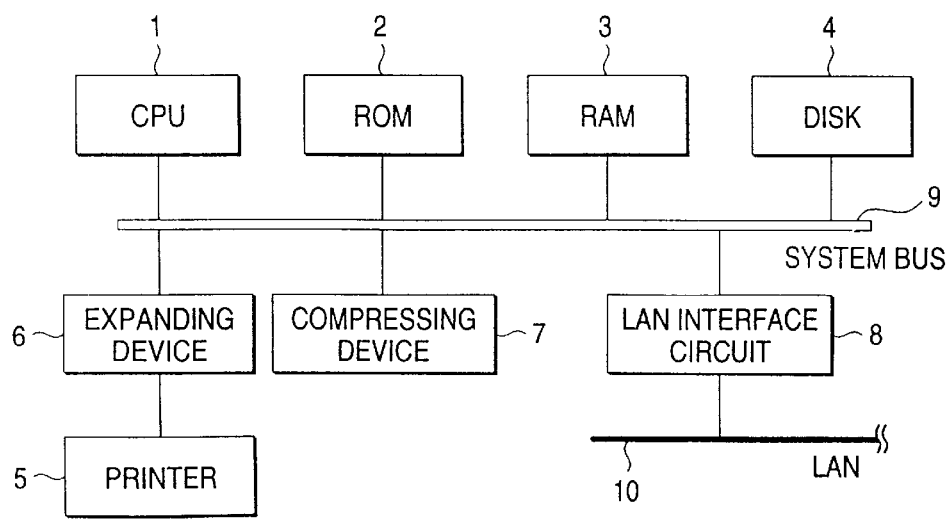
FIG. 2 is a block diagram illustrating a system structure example of a printer control apparatus as an embodiment of the present invention.

The present invention will be described below in detail with reference to the drawings. FIG. 2 is a block diagram illustrating a system structure example of a printer control apparatus as an embodiment of the image processing apparatus according to the present invention. A CPU 1 controls the whole of the apparatus in accordance with a control program stored in an ROM 2. An RAM 3 is used as a work area for processing and a buffer of image information. A disk unit (DISK) 4 which is, for example, a hard disk unit, stores image information, programs, and so on. A printer 5 is a device for printing the image information supplied thereto. An expanding device 6 restores, for example, the image data compressed and stored in the RAM 3 or the DISK 4 into original data, and outputs the restored data.

A compressing device 7, which will be described later in detail, receives image information from the RAM 3 or the DISK 4, compresses the image information, and outputs the compressed image data to the RAM 3 or the DISK 4 again. An LAN interface circuit 8 is a circuit for making interface with an external LAN 10, and image information to be printed is supplied to the LAN interface circuit 8 from another work station connected to the LAN 10 through the LAN interface circuit 8. A system bus 9 connects the respective circuits to each other in the apparatus. Besides an LAN, for example, a one-to-one parallel or serial interface circuit, or a removable information recording medium, such as a floppy disk unit, may be used for the input of image information.

Figure 1:
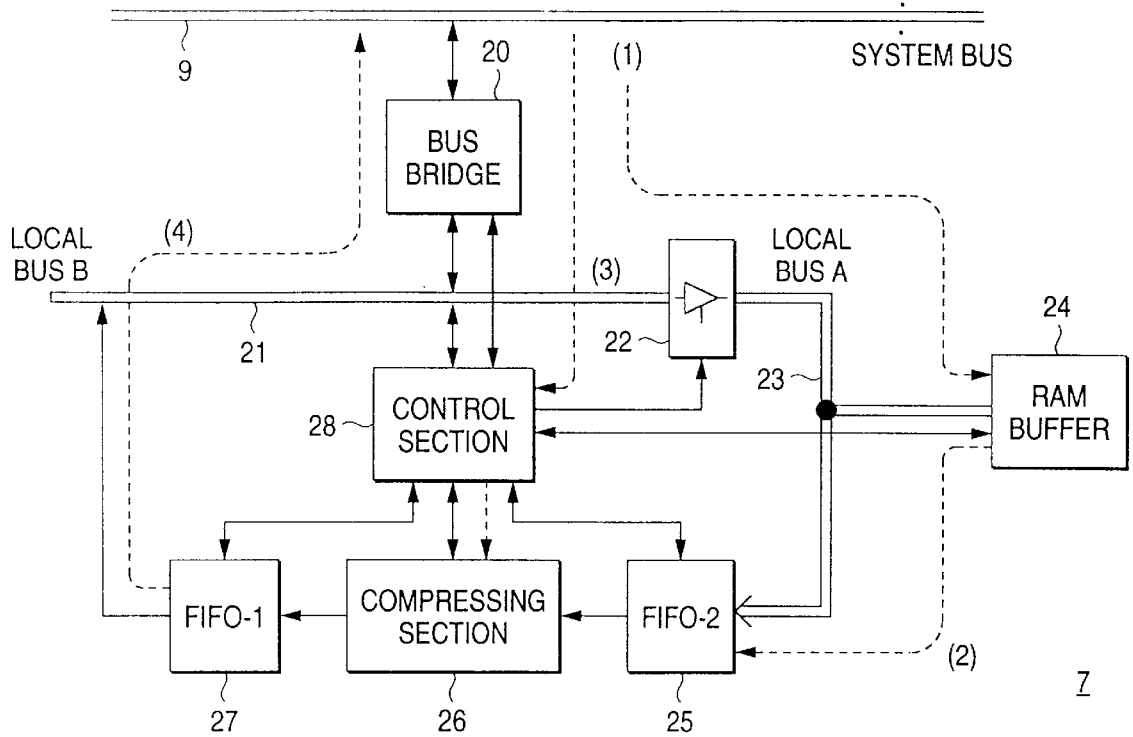
FIG. 1 is a block diagram illustrating the structure of a compressing device in FIG. 2.

FIG. 1 is a block diagram illustrating the structure of the compressing device 7 in FIG. 2. A bus bridge 20 which is connected between the system bus 9 and a local bus B 21 executes two functions; one being a function to execute write/read processing of parameters or status information from the CPU 1 to/from a control section 28 and a compressing section 26, and the other being a function to execute direct memory access (DMA) transfer processing. In the DMA transfer processing, the bus bridge 20 becomes a bus master on the system, and executes read/write access to the RAM 3 (or the DISK 4). For this, a data buffer exists in the bus bridge 20.

A gate circuit 22 which is separating means is connected between the local bus B 21 and a local bus A 23. The gate circuit 22 is a tristate bus driver for supplying data on the local bus B 21 to the local bus A 23 under the control of the control section 28. An RAM buffer 24 which is a buffer memory is an RAM for storing image data DMA-transferred from the RAM 3 through the gate circuit 22. The RAM buffer 24 is constituted by an SRAM, for example, having the capacity of 32 kbytes. An FIFO-2 25 is an FIFO buffer, for example, having the capacity of about 4 kbytes, and buffers the image data read out of the RAM buffer 24, under the control of the control section 28.

The compressing section 26 which is image processing means reads image data out of the FIFO-2 25, compresses the read-out image data by use of a single compression algorithm on the basis of a system instructed by the CPU 1, and supplies the compressed image data to an FIFO-1 27. The FIFO-1 27 is an FIFO buffer also having the capacity of about 4 kbytes. When a certain amount (for example, half of the capacity of the buffer) of data is stored in the buffer, the data is DMA-transferred to the RAM 3 (or the DISK 4) through the local bus B 21 and the bus bridge 20 under the control of the control section 28. The control section 28 controls the transfer operation of image data by the configuration and operation which will be described later, so that compression can be executed smoothly in the compressing section 26.

Figure 3:
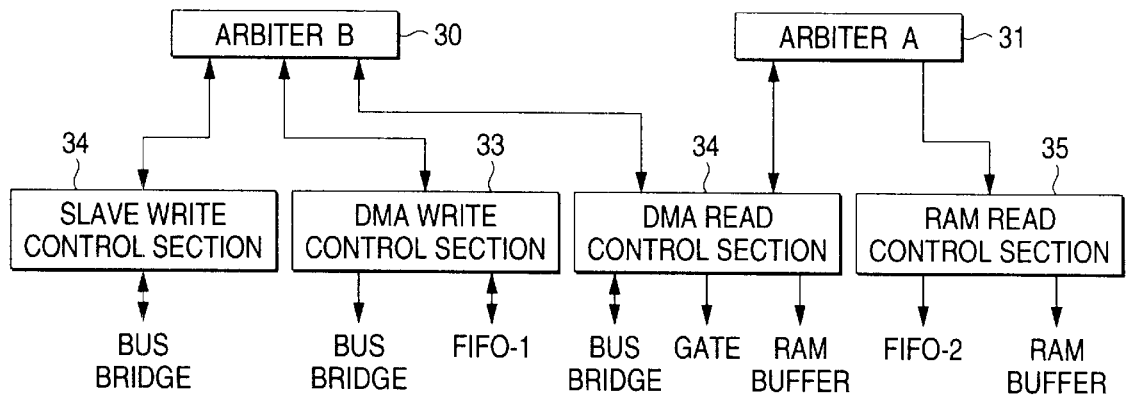
FIG. 3 is a block diagram illustrating the structure of a control section.

FIG. 3 is a block diagram illustrating the structure of the control section 28. An arbiter A 31 is a circuit for arbitrating competition of access to the local bus A 23, and a circuit which receives bus request signals from a plurality of control sections 34 and 35, and gives a bus use permission signal to either one of the control sections in accordance with a system which will be described later with reference to FIG. 5. The arbiter A 31 also performs timing control of write/read with respect to the RAM buffer 24.

An arbiter B 30 is a circuit for arbitrating competition of access to the local bus B 21, and a circuit which receives bus request signals from a plurality of control sections 32 to 34, and gives a bus use permission signal to any one of the control sections in accordance with a round robin system. The arbiter B 30 continues to output the permission signal till the control section which has been given the permission signal terminates one transfer cycle.

A slave write control section 32 receives write/read access to the inside of the control section 28 or registers of the compressing section 26 from the CPU 1 through the bus bridge 20, and transmits a bus request signal to the arbiter B 30 to use the local bus B 21. Upon reception of the permission, the slave write control section 32 controls a slave write cycle shown by the dotted line (3) in FIG. 1. When the transfer is completed, the control section 32 gives a notice of end to the arbiter B 30.

A DMA write control section 33 monitors, for example, the amount of data stored in the FIFO-1, and starts transfer control when stored data becomes not less than half of the capacity of the FIFO-1. Upon reception of the bus use permission from the arbiter B 30, the DMA write control section 33 reads compressed image data from the FIFO-1 27, and executes a DMA write cycle by which the image data are DMA-transferred to the RAM 3 through the local bus B 21 and the bus bridge 20 as indicated by the dotted line (4) in FIG. 1. The DMA write control section 33 interrupts the DMA write cycle when the buffer of the bus bridge 20 has no room, and gives a notice of end to the arbiter B 30 at the time of completion of the cycle.

A DMA read control section 34 is started up by the instruction of the CPU 1, and controls DMA transfer from the RAM 3 to the RAM buffer 24. It is therefore necessary to obtain the bus use permission from both the arbiter A 31 and the arbiter B 30. Upon reception of the permission, the DMA read control section 34 controls the gate circuit 22 to be opened, gives a write address and a write control signal to the RAM buffer 24, and executes a DMA read (RAM buffer write) cycle by which image data outputted from the bus bridge 20 is written into the RAM buffer 24, as indicated by the dotted line (1) in FIG. 1.

An RAM read control section 35 reads image data from the RAM buffer 24 by the control of the CPU 1, and transfers the image data to the FIFO-2 25 as indicated by the dotted line (2) in FIG. 1. The control section 28 having such functions may be made up of individual hard wares, or realized by a controller of a stored program system.

Figure 5:
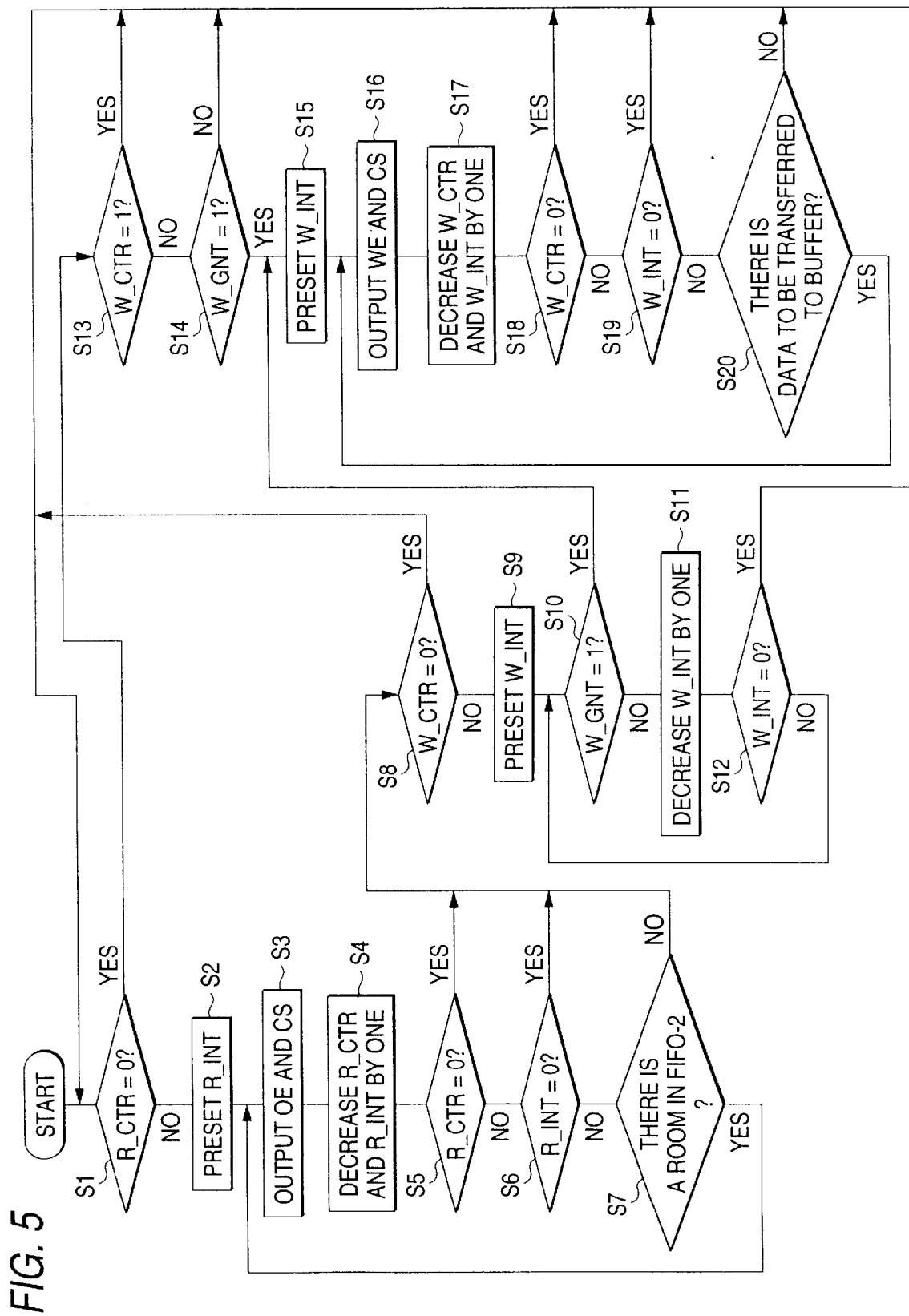
FIG. 5 is a flow chart showing the operations of a DMA read control section, an RAM read control section and an arbiter A.

FIG. 5 is a flow chart showing the operation (processing) of the DMA read control section 34, the RAM read control section 35 and the arbiter A 31 in FIG. 3. This processing is roughly divided into three sections; an RAM buffer read cycle corresponding to steps S1 to S7 in FIG. 5; a loop waiting for a user permission signal from the arbiter B 31 corresponding to steps S8 to S12 in FIG. 5; and a DMA read (RAM buffer write) cycle corresponding to steps S13 to S20 in FIG. 5. In step S1, judgment is made as to whether a read counter R_CTR in the RAM read control section 35 takes 0 or not. The amount of data to be read is set through this counter R_CTR by the CPU 1, and the counter R_CTR is decreased by one every time when one data piece is transferred. Therefore, data to be transferred remains when the counter R_CTR is not 0.

When the judgment in step S1 is negative (data exists), the routine goes to step S2, and an interval counter R_INT counting the number of data pieces to be transferred in one read cycle is preset to a predetermined value (for example, 4). In step S3, an output enable signal (OE) and a chip select signal (CS) are outputted from the RAM read control section 35 to the RAM buffer 24, and a read address is outputted at the same time. On the basis of these signals, one piece of image data is read from the RAM buffer 24, and stored in the FIFO-2.

In step S4, the counters R_CTR and $R_{\_INT}$ are decreased by one respectively. Then, the read address is renewed (increased by one) sequentially, and reset when it reaches the maximum value. In step S5, it is judged whether the counter R_CTR is 0 or not. The routine goes to step S8 when the result is affirmative, while goes to step S6 when negative. In step S6, it is judged whether the counter R_INT is 0 or not. The routine goes to step S8 when the result is affirmative, while goes to step S7 when negative. In step S7, judgment is made as to whether there is a room in the FIFO-2 or not. The routine goes to step S8 when the result is negative, while returns to step S3 and repeats reading data from the RAM buffer 24 when affirmative.

In step S8, it is judged whether a write counter W_CTR in the RAM write control section 34 takes 0 or not. The amount of data to be written is set through this counter W_CTR by the CPU 1, and the counter W_CTR is decreased by one every time when one data piece is transferred. Therefore, data to be DMA-transferred remains when the counter W_CTR is not 0. Although returning to step S1 when the judgment in step S8 is affirmative, the routine goes to step S9 when negative. In step S9, an interval counter W_INT counting the number of data pieces to be transferred in one write cycle is preset to a predetermined value (for example, 4).

In step S10, it is judged whether a bus use permission signal W_GNT from the arbiter B 30 is 1 (permission) or not. The routine goes to step S15 when the result is affirmative, while goes to step S11 when negative. In step S11, the counter W_INT is decreased by one. In step S12, judgement is made as to whether the counter W_INT is 0 or not. The routine returns to step S10 when the result is negative, while goes to step S1 when affirmative. The processing of steps S10 to S12 is for waiting for a use permission signal from the arbiter B, and the routine goes to write processing in step S15 et seq. immediately after the signal W_GNT becomes 1.

In step S13, judgement is made as to whether the counter W_CTR is 0 or not. The routine returns to step S1 when the result is affirmative, while goes to step S14 when negative. In step S14, the interval counter W_INT is preset to a predetermined value (for example, 4). In step S16, a write enable signal (WE) and a chip select signal (CS) are outputted from the DMA read control section 34 to the RAM buffer 24, and a write address is outputted at the same time. Further, an operation signal is outputted to the gate circuit 22. On the basis of these signals, image data is stored into the RAM buffer 24 through the bus bridge 20, the local bus B, and the gate circuit 22.

In step S17, the counters W_CTR and W_INT are decreased by one respectively. Then, the write address is renewed (increased by one) sequentially, and reset when it reaches the maximum value. In step S18, it is judged whether the counter W_CTR is 0 or not. The routine goes to step S1 when the result is affirmative, while goes to step S19 when negative. In step S19, judgement is made as to whether the counter W_INT is 0 or not. The routine goes to step S1 when the result is affirmative, while goes to step S20 when negative. In step S20, it is judged whether there is data to be transferred to the buffer in the bus bridge 20 or not. The routine goes to step S16 when the result is affirmative, while returns to step S1 when negative.

With such processing being performed, when data to be transferred exists, data is transferred in every lump preset in their associated interval counters. When both a write request and a read request coexist, they are processed alternately.

Figure 7:
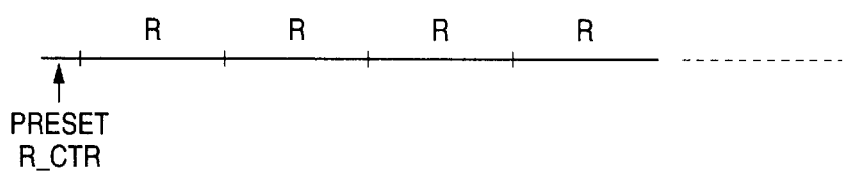
FIGS. 7($a$) and 7($b$) are time charts showing the operation of an RAM buffer.
Figure 7:
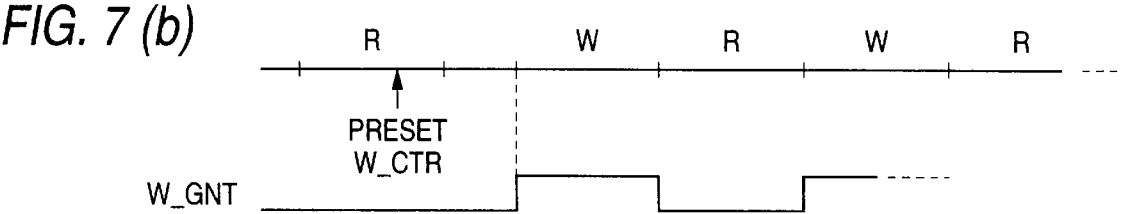

FIGS. 7(a) and 7(b) are time charts showing the operation of the RAM buffer 24. FIG. 7(a) shows the operation when the CPU 1 set a desired value in the counter R_CTR in the case where image data have been already stored in the RAM buffer 24. In such a case, the routine goes from step S1 to step S2 in the flow chart of FIG. 5, and image data pieces are read out so many times (for example, 4 times) as preset in the counter R_INT. When the counter R_INT becomes 0, the routine goes from step S6 to step S8. If the counter W_CTR is 0, the routine goes to step S1 again, and the read cycle is repeated. Also in the case where a value is set only in the counter W_CTR, the write cycle from step S16 to step S20 is repeated in the same manner as FIG. 7(a).

FIG. 7(b) shows processing when a value is set in the counter W_CTR by the CPU 1 while the read cycle in FIG. 7(a) is executed. When write to the counter W_CTR is executed in desired timing, the routine goes from step S6 to step S8 and step S9. Although a bus request signal is transmitted to the arbiter B 30, the permission signal W_GNT will not be 1 when the bus is used by another control section. Therefore, waiting for the signal W_GNT taking 1 is repeated so many times as preset in the counter W_INT in step S9 in the maximum case. This is because if waiting is repeated to an unlimited extent, read processing of steps S3 to S7 can not be executed, and data in the FIFO-2 are exhausted.

When the signal W_GNT becomes 1, the routine goes to step S15, and image data are written into the RAM buffer 24 so many times as preset in the counter W_INT. When the counter W_INT is 0, the routine returns to step S1 from step S19. If the counter R_CTR is not 0, the routine goes to step S2, and read processing is executed this time. Therefore, when neither the counter R_CTR nor the counter W_CTR is 0, the read cycle and the write cycle are executed alternately, and the numbers of transferred data pieces in the respective cycles can be set desirably.

Figure 4:
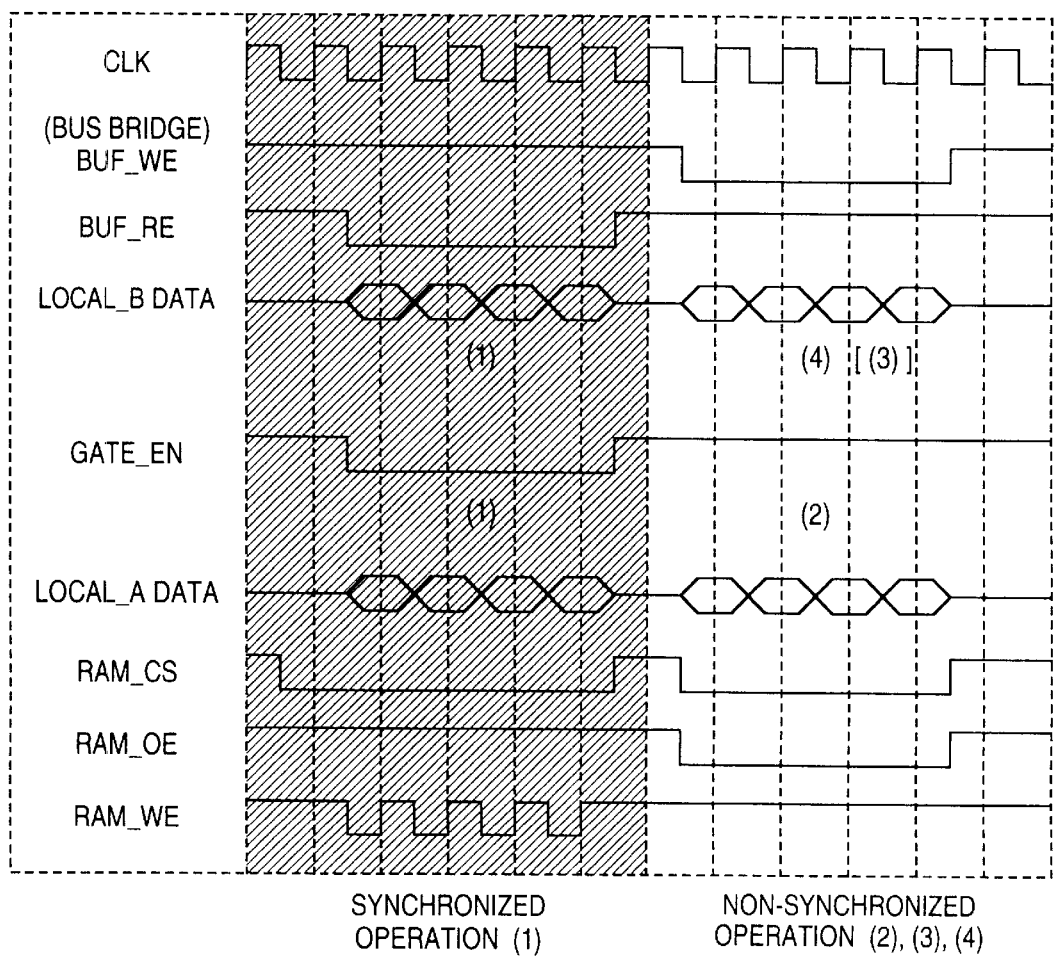
FIG. 4 is a waveform diagram illustrating signal waveforms in respective transfer cycles.

FIG. 4 is a waveform diagram illustrating signal waveforms in respective transfer cycles. The left side of FIG. 4 shows a write cycle (1) to the RAM buffer 24. In this case, the local bus B shown in the upper portion and the local bus A shown in the lower portion operate synchronously. First, the control section 28 transmits a buffer read enable signal BUF_RE (negative logic; 0 is active, and the same is applied to other signals) to the bus bridge 20, and data is outputted sequentially from the buffer in the bus bridge 20 to the local bus B synchronously with a clock signal CLK. The control section 28 makes the gate circuit 22 opened by means of a gate enable signal GATE_EN so as to output data on the bus B 21 to the bus A 23. In addition, signals WE and CS and an address signal are generated for the RAM buffer 24, so that data on the bus A is written therein. In this embodiment, although four data pieces are written in one write cycle, the number of data pieces may be set desirably through the counter R_INT.

The right side of FIG. 4 shows the operations of a read cycle (2) from the RAM buffer 24 and a DMA write cycle (4). In this case, the control section 28 makes the gate circuit 22 closed by means of the gate enable signal GATE_EN so as to separate the bus B 21 from the bus A 23. Therefore, these operations (2) and (4) can be executed at the same time. A slave write cycle (3) can be also executed simultaneously with the read cycle (2).

Figure 6:
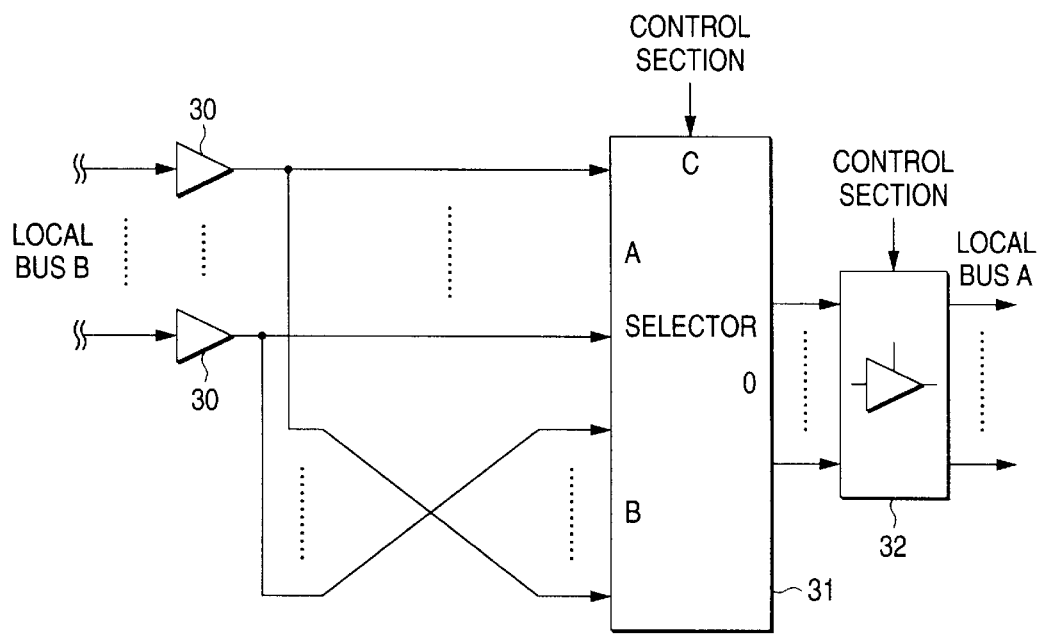
FIG. 6 is a circuit diagram illustrating a second embodiment of a gate circuit.

Although the embodiment of the present invention has been described above, modifications as will be described below can be considered. FIG. 6 is a circuit diagram illustrating a second embodiment of the gate circuit 22. In a printer or the like, for example, when double-side printing or the like is to be performed, it is necessary to rotate an image by 180 degrees. In this case, it is necessary not only to reverse the array of image data pieces but also to reverse the array of pixels in the respective image data pieces. The second embodiment of the gate circuit has pixel data array reversing means providing in the gate circuit 22.

In FIG. 6, image data pieces on the local bus B 21 received by a bus receiver 30 are connected not only to an input terminal group A of a selector 31 with their array left originally, but also to an input terminal group B of the selector 31 as they are rearranged so that the most significant bit comes to the position of the least significant bit, while the least significant bit comes to the position of the most significant bit. The selector 31 outputs the data pieces of the terminal group A to an output terminal group O if a control signal put into a terminal C from the control section 28 is 0, while outputs the data pieces of the terminal group B if 1. A tristate bus driver circuit 32 outputs data pieces outputted from the selector 31 to the local bus A on the basis of a control signal from the control section.

With such a circuit, bit arrays in respective image data pieces can be reversed. For example, if image data pieces in the RAM 3 are rearranged by the control of the CPU 1, image data pieces reversed by 180 degrees can be obtained. Alternatively, if the whole of one page of image data pieces can be stored in the RAM buffer 24, the data pieces may be rearranged by inverting the write order to the RAM buffer 24 and the read order therefrom.

As has been described in detail, in the image processing apparatus according to the present invention, for example, by adjusting the values of interval counters respectively, it is possible to control data input speed to the RAM buffer 24 and data transfer speed to the FIFO-2 25 independently of each other, and it is possible to perform control so that processing in a compressing circuit can be executed smoothly. Although permission issued from the arbiter B is required at the time of write processing to the RAM buffer 24, for example, if a bus request is transmitted previously, it is possible to shorten the wait time.

Although an example in which compressing is performed as image processing is disclosed in the embodiment, the present invention is applicable to, for example, a case of expansion processing or other desired image processing.

As described above, in the present invention, the transfer on the bus, and the internal transfer from the buffer to the image processing apparatus are operated separately from each other, so that the image processing apparatus can be operated at a high speed. In addition, the operating speed of the image processing apparatus does not become a hindrance against the transfer speed to a printer, so that there is an effect that the printing speed as a whole can be increased.

What is claimed is:

1. An image processing apparatus in which image data is compressed and stored and the compressed and stored image data is expanded so as to be output to a printer, said apparatus comprising:

a central processing unit;

a system bus connected to said central processing unit;

a first local bus;

a bus bridge for connecting said system bus and said first local bus to each other;

a second local bus;

separating means for connecting/separating said first and second local buses to/from each other in response to a control signal;

a buffer memory connected to said second local bus for storing data to be compressed/expanded which is sent from said first local bus through said second local bus and said separating means;

a compressing/expanding section respectively to said first and second local buses for receiving the data read out of said buffer memory through said second local bus and compressing/expanded data so as to output the compressed/expanded data to said first local bus; and control means connected to said first local bus for outputting to said separating means the control signal for connecting/separating said first and second local buses to/from each other in response to a command sent from said central processing unit through said system bus and said bus bridge and for controlling data reading from said buffer memory to said second local bus in a state that said first and second local buses are separated from each other.

2. The image processing apparatus according to claim 1, wherein said control means control said separating means so that said buffer memory is connected to said system bus when image data is transferred from said system bus to said buffer memory, while said buffer memory is separated from said system bus when image data is supplied from said buffer memory to said compressing/expanding section.

3. The image processing apparatus according to claim 2, wherein when image data is supplied from said buffer memory to said compressing/expanding section, said control means performs transfer of image data processed by said compressing/expanding section to said system bus in parallel to the operation of supply of the image data from said buffer memory to said compressing/expanding section.

4. The image processing apparatus according to claim 2, wherein when image data is supplied from said buffer memory to said compressing/expanding section, said control means performs transfer of image data which is sent from said system bus to said control means or said compressing/expanding section in parallel to the operation of supply of the image data from said buffer memory to said compressing/expanding section.

5. The image processing apparatus according to claim 1, wherein said control means reads out data to be compressed/expanded from said buffer memory while reversing the data and supplies the read-out data to said compressing/expanding section.

6. The image processing apparatus according to claim 1, wherein said separating means is constituted by a gate circuit.

* * * * *

UNITED STATES PATENT AND TRADEMARK OFFICE
CERTIFICATE OF CORRECTION

PATENT NO.    : 5,963,717
DATED         : October 5, 1999
INVENTOR(S)   : Kenji IMAMURA It is certified that error appears in the above-identified patent and that said Letters Patent is hereby corrected as shown below:

Claim 1, Column 7, line 41, after "section", insert --connected--.

Claim 2, Column 8, line 13, "means control" should read --means controls--.

Signed and Sealed this

Twenty-sixth Day of September, 2000

Attest:

Q. TODD DICKINSON

*Attesting Officer*     *Director of Patents and Trademarks*